(12) United States Patent
Galson

(10) Patent No.: US 8,430,417 B1
(45) Date of Patent: Apr. 30, 2013

(54) BICYCLE CHAINSTAY PIVOT ASSEMBLY

(75) Inventor: Ross E. Galson, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/370,120

(22) Filed: Feb. 9, 2012

(51) Int. Cl.
*B62K 19/34* (2006.01)

(52) U.S. Cl.
USPC .......................................................... 280/284

(58) Field of Classification Search ................... 280/284, 280/288, 283, 277, 285, 287, 275, 124.169; 180/227, 226, 219
See application file for complete search history.

(56) References Cited

U.S. PATENT DOCUMENTS

| | | | |
|---|---|---|---|
| 2,452,758 A | | 11/1948 | Hutchins |
| 5,975,550 A | | 11/1999 | Schonfeld |
| 5,997,022 A | * | 12/1999 | Matsui ........................... 280/284 |
| 6,276,706 B1 | * | 8/2001 | Yih ............................... 280/284 |
| 6,386,567 B1 | | 5/2002 | Schonfeld |
| 6,612,600 B2 | | 9/2003 | Devitt et al. |
| 6,880,846 B2 | | 4/2005 | Schonfeld |
| 7,222,870 B2 | * | 5/2007 | Fukui ............................. 280/284 |
| 7,665,563 B2 | | 2/2010 | Misaki et al. |
| 7,757,801 B2 | | 7/2010 | Toyoda |
| 8,033,558 B2 | | 10/2011 | Earle |
| 2003/0193163 A1 | * | 10/2003 | Chamberlain et al. ........ 280/284 |
| 2008/0238030 A1 | * | 10/2008 | Tseng ........................... 280/284 |

* cited by examiner

*Primary Examiner* — Tashiana Adams
(74) *Attorney, Agent, or Firm* — Michael Best & Friedrich LLP

(57) ABSTRACT

A bicycle includes a front wheel and a rear wheel. A main frame includes a rear pivot support defining a rear pivot axis. A front fork is pivotally coupled to the main frame and supported by the front wheel. A chainstay is pivotally coupled to the pivot support and supported by the rear wheel. The chainstay includes a left mounting portion and a right mounting portion. A bearing assembly pivotally supports the chainstay relative to the pivot support. The bearing assembly includes a pivot shaft having a left shaft portion and a right shaft portion movable relative to the left shaft portion along the rear pivot axis. The left mounting portion is secured to the left shaft portion and the right mounting portion is secured to the right shaft portion.

20 Claims, 5 Drawing Sheets

US 8,430,417 B1

BICYCLE CHAINSTAY PIVOT ASSEMBLY

BACKGROUND

The present invention relates to bicycle suspension, and specifically to a pivot assembly for a chainstay, swing arm, or other component pivotally coupled to a bicycle frame.

Many modern bicycles have resilient suspension systems that facilitate a smoother ride over rough terrain. For example, some bicycles include a front fork with telescoping tubes that are provided with springs and dampers to cushion the front end of the bicycle. Bicycles have also been provided with a rear chainstay pivotally attached to a main frame and including springs and dampers to cushion the rear end of the bicycle.

The rear chainstay (often called a swingarm when pivotally attached) is commonly attached to a pivot shaft that is rotationally supported in a pivot shell, which is part of the main frame of the bicycle. Two laterally-spaced pivot bearings can be used to support the pivot shaft in the pivot shell. In one prior art system, the pivot shaft is a two-piece arrangement that threads together to simultaneously secure the chainstay to the pivot shell and tighten the axial play of the bearings. This type of arrangement is disclosed in U.S. Pat. No. 8,033,558, which is hereby incorporated by reference in its entirety.

SUMMARY

In one embodiment, the invention provides a bicycle. The bicycle includes a front wheel and a rear wheel. A main frame includes a rear pivot support defining a rear pivot axis. A front fork is pivotally coupled to the main frame and supported by the front wheel. A chainstay is pivotally coupled to the pivot support and supported by the rear wheel. The chainstay includes a left mounting portion and a right mounting portion. A bearing assembly pivotally supports the chainstay relative to the pivot support. The bearing assembly includes a pivot shaft having a left shaft portion and a right shaft portion movable relative to the left shaft portion along the rear pivot axis. The left mounting portion is secured to the left shaft portion and the right mounting portion is secured to the right shaft portion.

In another embodiment the invention provides a method of pivotally securing a chainstay to a main frame of a bicycle, where the chainstay includes a left mounting portion and a right mounting portion and the main frame includes a rear pivot support defining a rear pivot axis. The method includes inserting a pivot shaft into the rear pivot support, where the pivot shaft includes a left shaft portion and a right shaft portion. A position of the left shaft portion relative to the right shaft portion is adjusted along the rear pivot axis. The left mounting portion is secured to the left shaft portion. The right mounting portion is secured to the right shaft portion.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
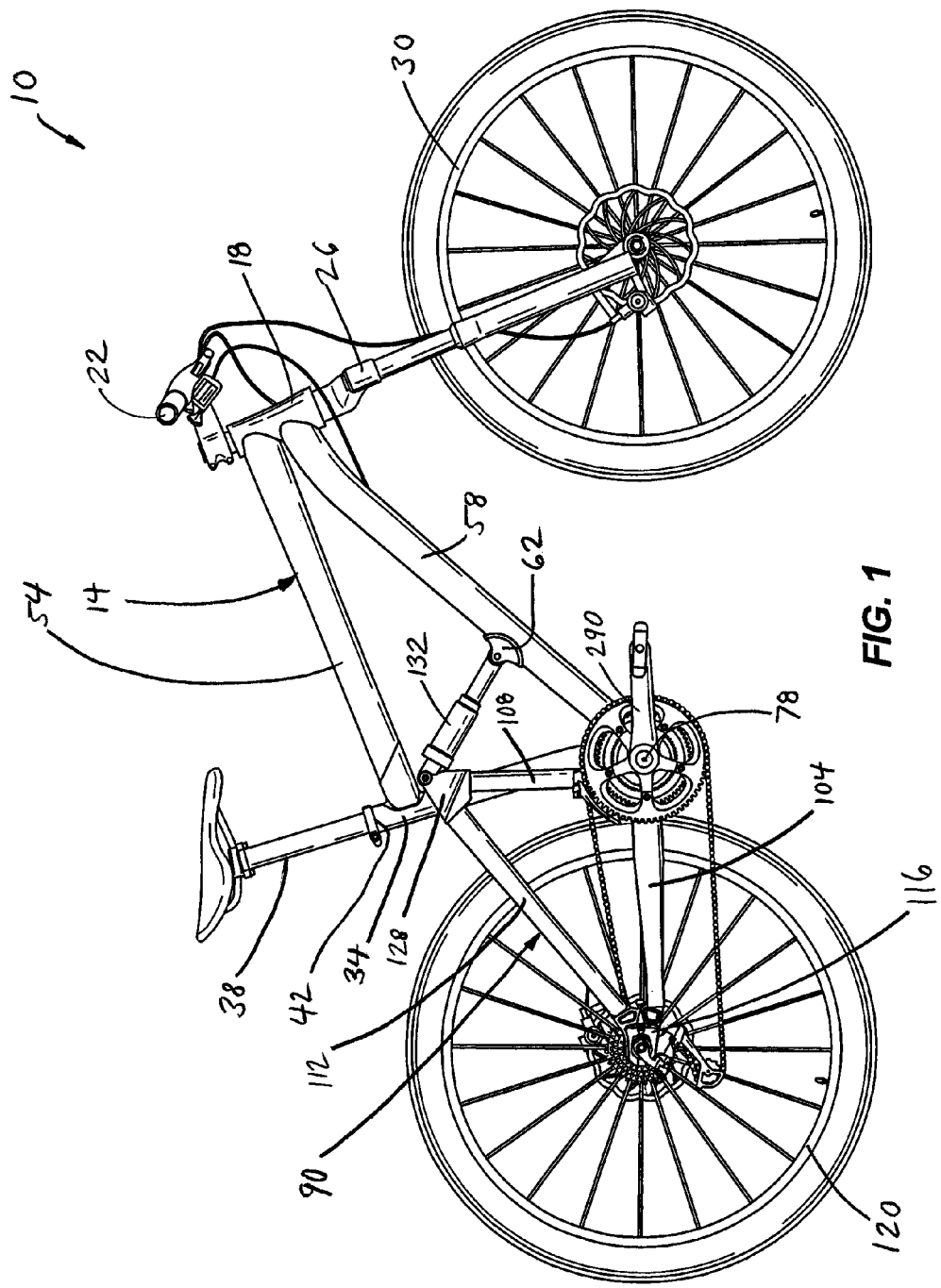
FIG. 1 is a side view of a bicycle embodying the present invention.
Figure 2:
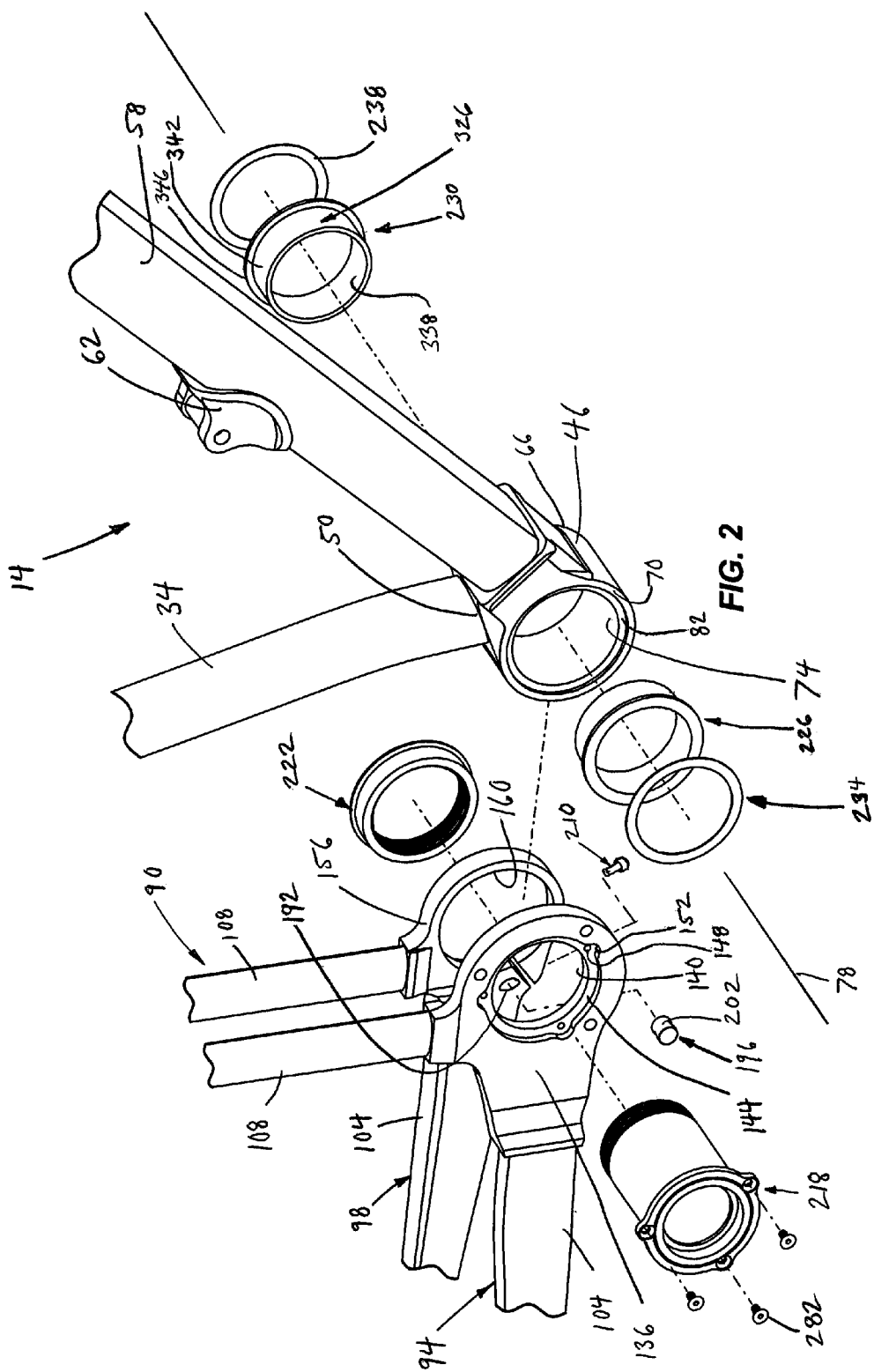
FIG. 2 is an enlarged exploded view of a portion of the bicycle in FIG. 1, including a chainstay pivot bearing assembly.

FIG. 1 illustrates a bicycle 10 including a main frame 14. The main frame 14 includes a head tube 18 pivotally supporting a handlebar 22, a front fork 26, and a front wheel 30. A seat tube 34 supports a seat post 38 at a first end 42 and is coupled to a pivot support 46 (FIG. 2) at a second end 50. A top tube 54 extends between the head tube 18 and the first end 42 of the seat tube 34. A down tube 58 extends between the head tube 18 and the pivot support 46 (FIG. 2). A main frame strut boss 62 is coupled to the down tube 58 between the head tube 18 and the pivot support 46. In other embodiments, the main frame strut boss may be coupled to the top tube 54.

Figure 6:
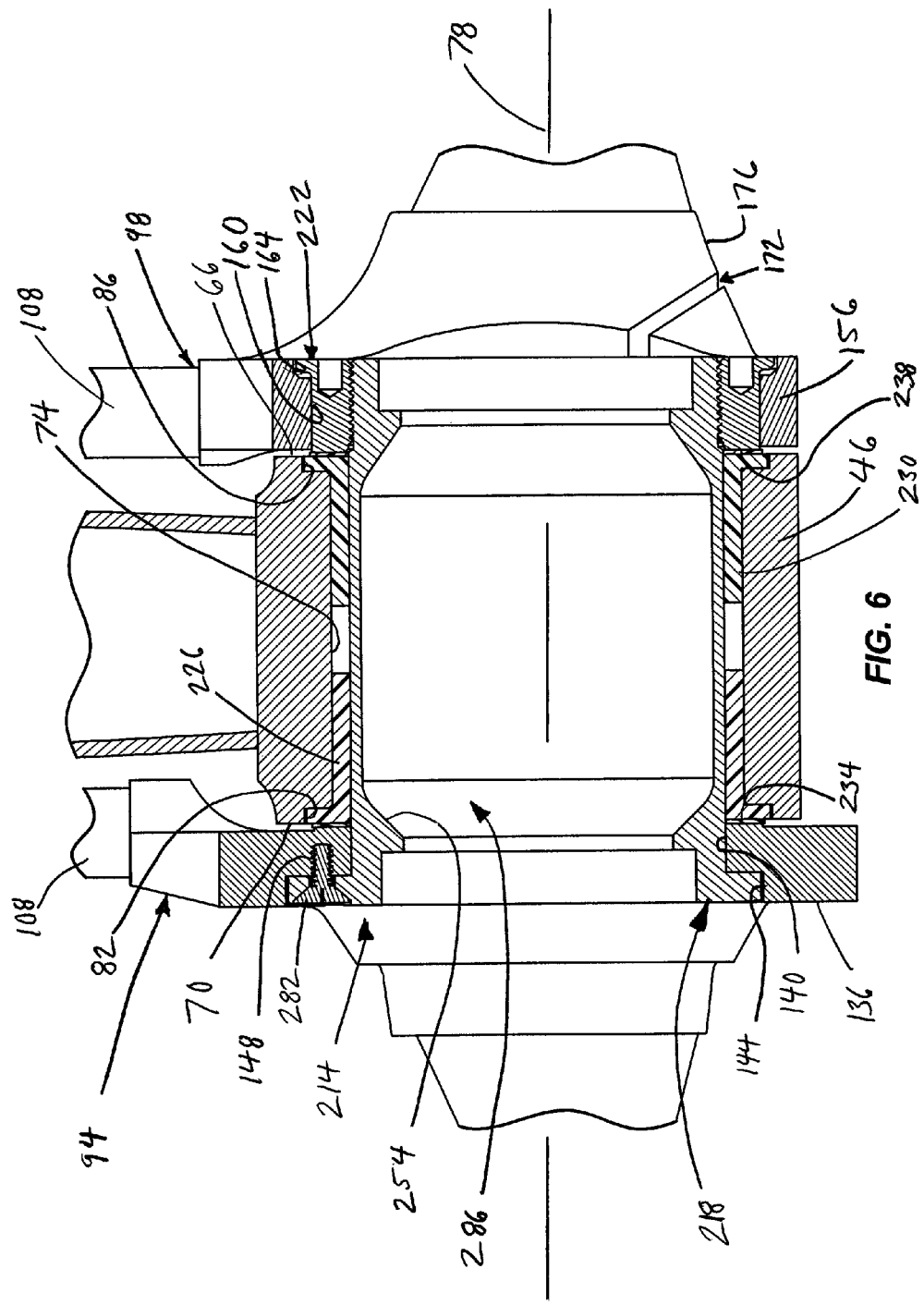
FIG. 6 is a cross sectional view along section 6-6 of FIG. 5.

Referring to FIGS. 2 and 6, the pivot support 46 has a left end 66 and a right end 70, and defines a cylindrical pivot support bore 74 extending from the left end 66 to the right end 70. The cylindrical pivot support bore 74 is disposed along a pivot support axis 78. Referring to FIG. 6, the right end 70 of the pivot support bore 74 includes a right counterbore 82, and the left end 66 of the pivot support bore 74 includes a left counterbore 86.

A chainstay assembly 90 is coupled to the main frame 14 for pivoting about the pivot support axis 78. The chainstay assembly 90 includes a right half 94 and a left half 98. Referring to FIG. 1, each of the right half 94 and left half 98 of the chainstay assembly 90 includes a horizontal member 104, an upright member 108, and a diagonal support member 112. Dropouts 116 connect the respective horizontal members 104 and the respective diagonal support members 112. The dropouts 116 support a rear wheel 120 for rotation. Chainstay strut bosses 128 connect the upright members 108 and the diagonal support members 112. The chainstay strut bosses 128, in combination with the main frame strut boss 62, support a spring and damper assembly 132 that provides for shock absorption between the chainstay assembly 90 and the main frame 14.

Referring to FIGS. 2 and 6, on the right half 94, the upright member 108 and horizontal member 104 are coupled to a right mounting portion 136. The right mounting portion 136 defines a right pivot bore 140 surrounded by a right recessed rim 144. The recessed rim 144 is substantially circular. Three threaded apertures 148 are circumferentially space about the recessed rim. Referring to FIG. 2, the recessed rim 144 further defines three semi-circular radial extensions 152, where each radial extension 152 substantially surrounding a threaded aperture 148.

Figure 5:
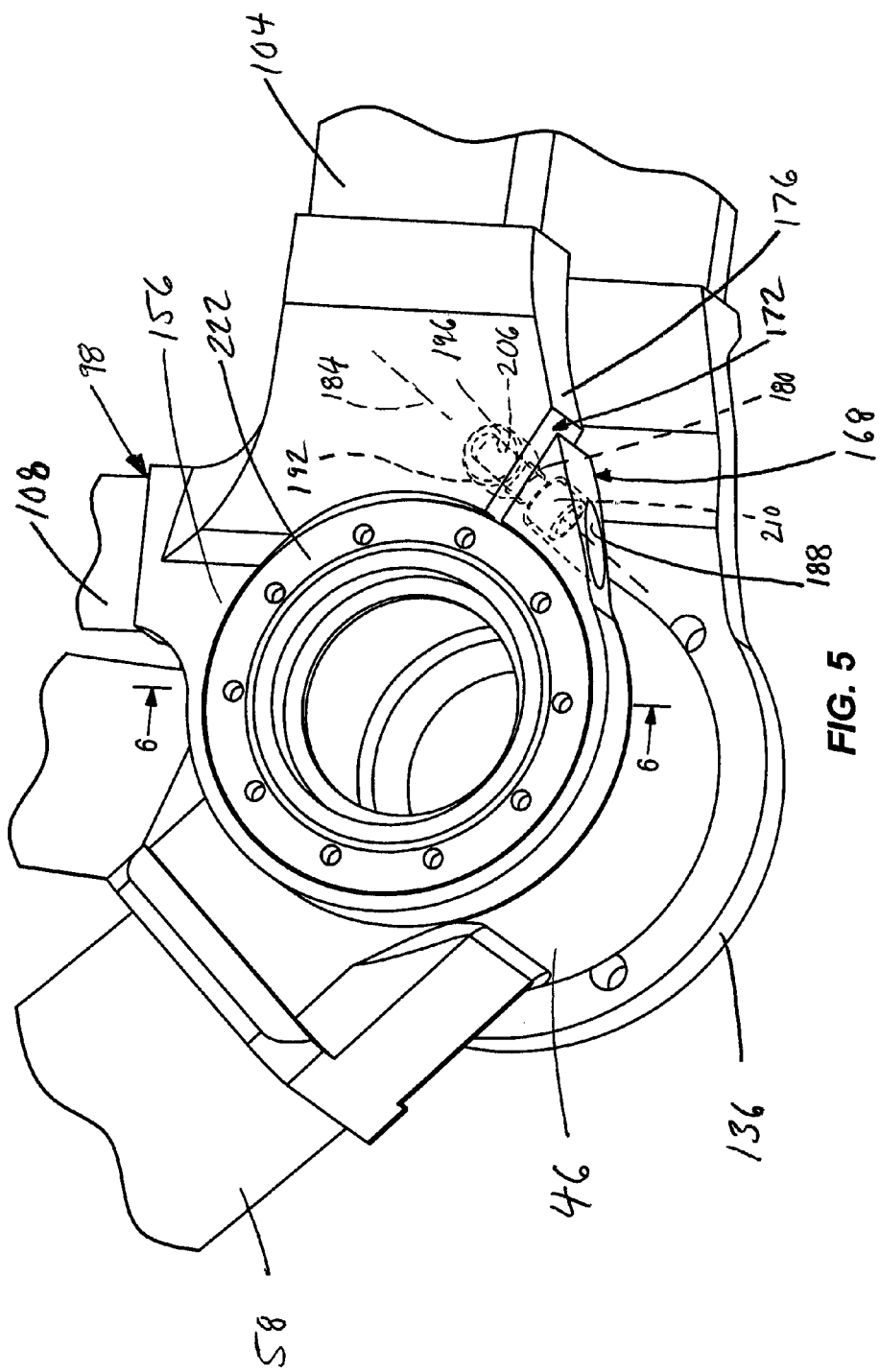
FIG. 5 is an enlarged perspective view of a portion of the bicycle of FIG. 1, including the chainstay pivot bearing assembly.

Referring to FIGS. 5 and 6, on the left half 98, the upright member 108 and the horizontal member 104 are coupled to a left mounting portion 156. Referring to FIG. 6, the left mounting portion 156 defines a left pivot bore 160, surrounded by a left recessed rim 164. The left pivot bore 160 is substantially co-axially aligned with the right pivot bore 140.

Referring to FIG. 5, the left mounting portion 156 includes a pinch clamp assembly 168 including a pinch gap 172 extending substantially radially from the left pivot bore 160 to an exterior wall 176 of the left mounting portion 156. A pinch fastener bore 180 extends from the exterior wall 176 across the pinch gap 172, along a pinch fastener axis 184 that is substantially perpendicular to the pinch gap 172. The pinch fastener bore 180 includes a counterbore portion 188 for receiving a fastener head.

Referring to FIG. 2, the left mounting portion 156 further defines an insert bore 192 that is substantially perpendicular to the pinch fastener axis 184. The pinch clamp assembly 168 further comprises a threaded insert 196. The threaded insert 196 includes a cylindrical body 202 that is received by the insert bore 192. Referring to FIG. 5, the threaded insert 196 defines a threaded aperture 206 that is substantially perpendicular to the cylindrical body 202. When the threaded insert 196 is disposed within the insert bore 192, the threaded aperture 206 of the insert 196 is substantially aligned with the pinch fastener axis 184.

Referring to FIGS. 2 and 5, the pinch clamp assembly 168 further comprises a pinch fastener 210, such as the illustrated socket head cap screw. Referring to FIG. 5, the pinch fastener 210 is adjustably threaded into the threaded insert 196, allowing a user to compress the pinch gap 172, thereby variably adjusting a diameter of the left pivot bore 160. In other embodiments, a portion of the pinch fastener bore 180 may be threaded to receive the pinch fastener 210, thereby eliminating the threaded insert.

Referring to FIGS. 2 and 6, the chainstay assembly 90 is pivotally coupled to the pivot support 46 with a bearing assembly 214. The bearing assembly 214 includes a right shaft portion 218, a left shaft portion 222, a right plane bearing 226, a left plane bearing 230, a right thrust washer 234, and a left thrust washer 238.

Figure 3:
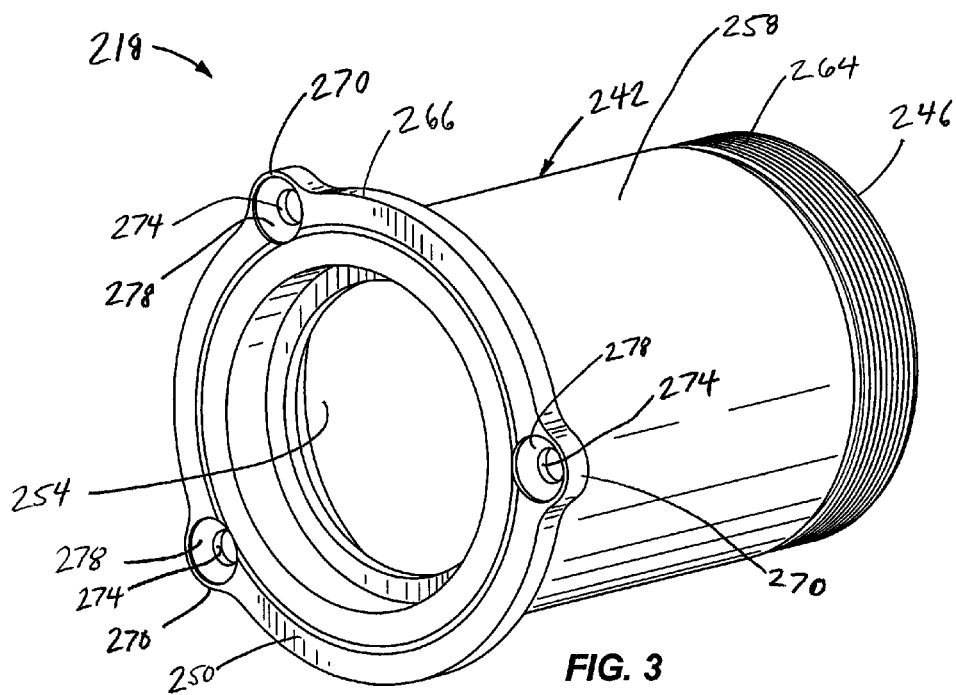
FIG. 3 is a perspective view of a right shaft portion of the bearing assembly of FIG. 2.

Referring to FIG. 3, the right shaft portion 218 includes a substantially cylindrical body 242 with a first end 246, a second end 250, an inside surface 254 and an outside surface 258. The first end 246 includes a right coupling portion in the form of male screw threads 264. A radial flange 266 is coupled to the second end 250 of the cylindrical body 242. The radial flange 266 is substantially circular, with three semi-circular radial projections 270, such that the radial flange 266 is configured to seat within the right recessed rim 144 (FIG. 2). Referring back to FIG. 3, the radial flange 266 further defines three apertures 274, which align with the threaded apertures 148 of the right mounting portion 136 when the radial flange 266 is seated within the right mounting portion recessed rim 144. Each aperture 274 includes a countersunk portion 278. Referring to FIGS. 2 and 6, the right shaft portion 218 may be fixedly coupled to the right mounting portion 136 with three screws 282.

Referring to FIG. 6, the inside surface 254 of the right shaft portion 218 defines a bottom bracket shell 286 for receiving a bottom bracket assembly to rotatably support a crank assembly 290 (FIG. 1). In other embodiments, the bottom bracket may be separately disposed from the pivot support 46. For example, the bottom bracket can be disposed in a traditional main frame bottom bracket shell, where the main frame has a separate pivot support.

Figure 4:
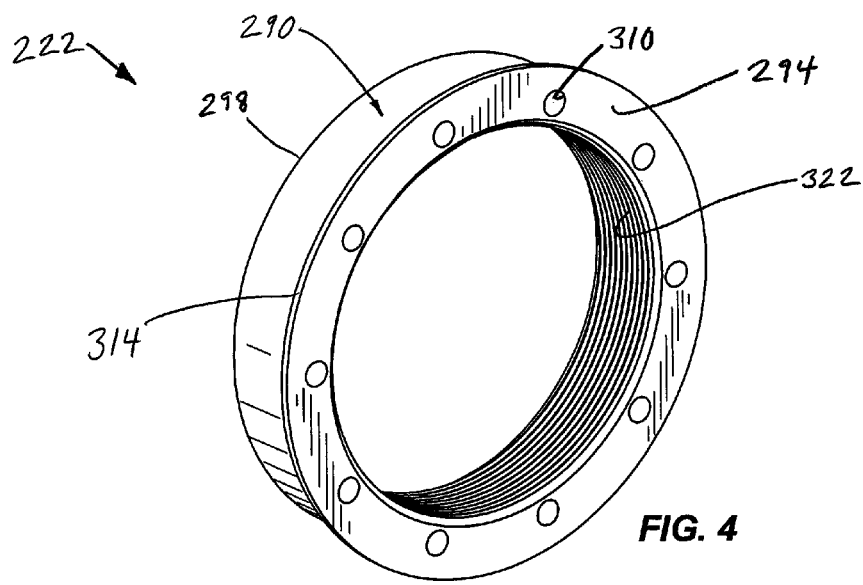
FIG. 4 is a perspective view of a left shaft portion of the bearing assembly of FIG. 2.

Referring to FIG. 4, the left shaft portion 222 includes a cylindrical body 290 with a first end 294, a second end 298. Circumferentially arranged spanner pin receptacles 310 are defined in the first end 294. The first end further defines a radial flange 314. An inside surface defines a left coupling portion in the form of female threads 322 corresponding to the thread size, type, and pitch of the male threads 264 of the right coupling portion. In the illustrated embodiment, both the right shaft portion 218 and the left shaft portion 222 are made of an aluminum alloy.

Referring to FIG. 2, each of the right plane bearing 226 and the left plane bearing 230 includes a radial bearing portion in the form of a cylindrical body 326 with an inside surface 338 and an outside surface 342. The outside surface 342 is sized such that the cylindrical body 326 is securely received by the pivot support bore 74, such as by an interference fit. The inside surface 338 is sized to radially support the outside surface 258 of the right shaft portion 218, as a rotational bearing surface. A thrust bearing portion in the form of a radial flange 346 is coupled to one end of the cylindrical body 326. Referring to FIG. 6, the radial flanges 346 are sized and configured to seat within the respective right and left counterbores 82 and 86 of the pivot support 46. The plane bearings 226 and 230 may be formed of nylon, for example. In other embodiments, the plane bearings may include ball bearings.

Referring to FIG. 2, the right thrust washer 234 and left thrust washer 238 are substantially planar, washer-like members. Referring to FIG. 6, the right thrust washer 234 provides thrust washer surfaces between the right mounting portion 136 and the right radial bearing 226. The left thrust washer 238 provides thrust washer surfaces between the left shaft portion 222 and the left mounting portion 156. The thrust washers 234 and 238 may be formed of stainless steel or aluminum, for example.

In order to pivotally secure the chainstay assembly 90 to the main frame 14, the right plane bearing 226 and left plane bearing 230 are seated in the pivot bore 74. The right thrust washer 234 and left thrust washer 238 are placed in contact with the radial flanges 346 of the right and left plane bearings 226 and 230, respectively. Next, the chainstay mounting portions 136 and 156 are place on opposing sides of the pivot support 46, such that the right pivot bore 140 and the left pivot bore 160 are substantially coaxially aligned along the pivot support axis 78.

The right shaft portion 218 is slid through the right mounting portion 136, right thrust washer 234, right plane bearing 226, pivot support bore 74, left plane bearing 230, and left thrust washer 238. The radial flange 266 of the right shaft portion 218 is seated in the right recessed rim 144 of the right mounting portion 136 and secured with the three screws 282.

The female threads 322 of the left shaft portion 222 are threaded onto the right shaft portion 218 using, for example, a pin-type spanner wrench inserted into the spanner pin receptacles 310, until the left shaft portion 222 is adjusted as desired (e.g., contacts the left thrust washer 238). A user may then torque the left shaft portion 222 until axial play in the pivot support assembly 214 along the pivot support axis is substantially eliminated, while still allowing the chainstay assembly 90 to pivot substantially freely relative to the main frame 14. Once this condition is satisfactorily achieved, the pinch fastener 210 is threaded into the threaded insert 196 until the pinch gap 172 is compressed, thereby substantially securing the left mounting portion 156 to the left shaft portion 222.

After periods of substantial use, it is envisioned that components of the bearing assembly 214 may experience dimensional changes due to wear and compression, resulting in increased axial play. A user can adjust the bearing assembly 214 by first loosening the pinch fastener 210, thereby opening the pinch gap 172 and freeing the left shaft portion 222 from the left mounting portion 156. The left shaft portion 222 can then be adjusted relative to the right shaft portion 218 until a desired pivot condition is again reached. Finally, the pinch fastener 210 is re-tightened to secure the left shaft portion 222 to the left mounting portion 156.

Thus, the invention provides, among other things, a chainstay pivot assembly. Various features and advantages of the invention are set forth in the following claims.

The invention claimed is:

1. A bicycle comprising:
a front wheel and a rear wheel;
a main frame comprising a rear pivot support defining a rear pivot axis;
a front fork pivotally coupled to the main frame and supported by the front wheel;
a chainstay pivotally coupled to the pivot support and supported by the rear wheel, the chainstay including a left mounting portion and a right mounting portion; and
a bearing assembly pivotally supporting the chainstay relative to the pivot support, the bearing assembly including a pivot shaft having a left shaft portion and a right shaft portion, the left shaft portion engaged with the right shaft portion and the right shaft portion movable relative to the left shaft portion along the rear pivot axis,
wherein the left mounting portion is secured to the left shaft portion and the right mounting portion is secured to the right shaft portion.

2. The bicycle of claim 1, wherein at least one of the left mounting portion and the right mounting portion includes a clamping assembly that is clamped onto the corresponding shaft portion.

3. The bicycle of claim 1, wherein the left and right shaft portions are threaded to each other such that rotation of one relative to the other changes the axial position of the left and right shaft portions relative to each other along the rear pivot axis.

4. The bicycle of claim 3, wherein rotation of the left and right shaft portions relative to each other is substantially prevented when the left and right mounting portions are secured to the left and right shaft portions, respectively.

5. The bicycle of claim 1, wherein the bearing assembly further includes a bearing member between the pivot shaft and the rear pivot support.

6. The bicycle of claim 5, wherein the bearing member includes a plane bearing.

7. The bicycle of claim 6, wherein the plane bearing includes a radial bearing portion and a thrust bearing portion.

8. The bicycle of claim 6, wherein the plane bearing comprises a polymer.

9. The bicycle of claim 5, wherein the bearing member includes a left plane bearing and a right plane bearing.

10. The bicycle of claim 9, wherein the left shaft portion engages the left plane bearing and the right shaft portion engages the right plane bearing.

11. The bicycle of claim 1, wherein at least one of the left shaft portion and the right shaft portion extends through at least a portion of both the left mounting portion and the right mounting portion.

12. A method of pivotally securing a chainstay to a main frame of a bicycle, the chainstay including a left mounting portion and a right mounting portion and the main frame including a rear pivot support defining a rear pivot axis, the method comprising:
inserting a pivot shaft into the rear pivot support, the pivot shaft including a left shaft portion and a right shaft portion;
rotating the left shaft portion relative to the right shaft portion along the rear pivot axis to cause axial movement of the left shaft portion relative to the right shaft portion;
securing the left mounting portion to the left shaft portion; and
securing the right mounting portion to the right shaft portion.

13. The method of claim 12, wherein one of the securing steps occurs before the adjusting step and the other of the securing steps occurs after the adjusting step.

14. The method of claim 12, further comprising inserting a bearing into the rear pivot support before inserting the pivot shaft into the rear pivot support.

15. The method of claim 12, wherein adjusting includes rotating the left shaft portion relative to the right shaft portion.

16. The method of claim 12, wherein adjusting continues until movement of the pivot shaft relative to the rear pivot support is substantially eliminated.

17. The method of claim 12, wherein one of the securing steps comprises pinching one of the left and right mounting portions to the corresponding shaft portion.

18. The method of claim 17, wherein pinching comprises tightening a pinch bolt.

19. The bicycle of claim 1, wherein rotation of one of the left and right shaft portions relative to the other shaft portion results in axial movement of the rotated shaft portion relative to the other shaft portion.

20. A bicycle comprising:
a front wheel and a rear wheel;
a main frame comprising a rear pivot support defining a rear pivot axis;
a front fork pivotally coupled to the main frame and supported by the front wheel;
a chainstay pivotally coupled to the pivot support and supported by the rear wheel, the chainstay including a left mounting portion and a right mounting portion; and
a bearing assembly pivotally supporting the chainstay relative to the pivot support, the bearing assembly including a pivot shaft having a left shaft portion and a right shaft portion movable relative to the left shaft portion along the rear pivot axis, the left and right shaft portions defining a bottom bracket shell of the bicycle,
wherein the left mounting portion is secured to the left shaft portion and the right mounting portion is secured to the right shaft portion.

* * * * *